(No Model.)  F. F. RAYMOND, 2d.  5 Sheets—Sheet 1.

HEEL NAILING MACHINE.

No. 317,851.  Patented May 12, 1885.

WITNESSES
Bowdoin S. Parker
Fred. P. Dolan

INVENTOR
F. F. Raymond 2d (No Model.)

F. F. RAYMOND, 2d.
HEEL NAILING MACHINE.

No. 317,851. Patented May 12, 1885.

WITNESSES
Bourdoin S. Parker
Fred. R. Dolan.

INVENTOR
F. F. Raymond 2d

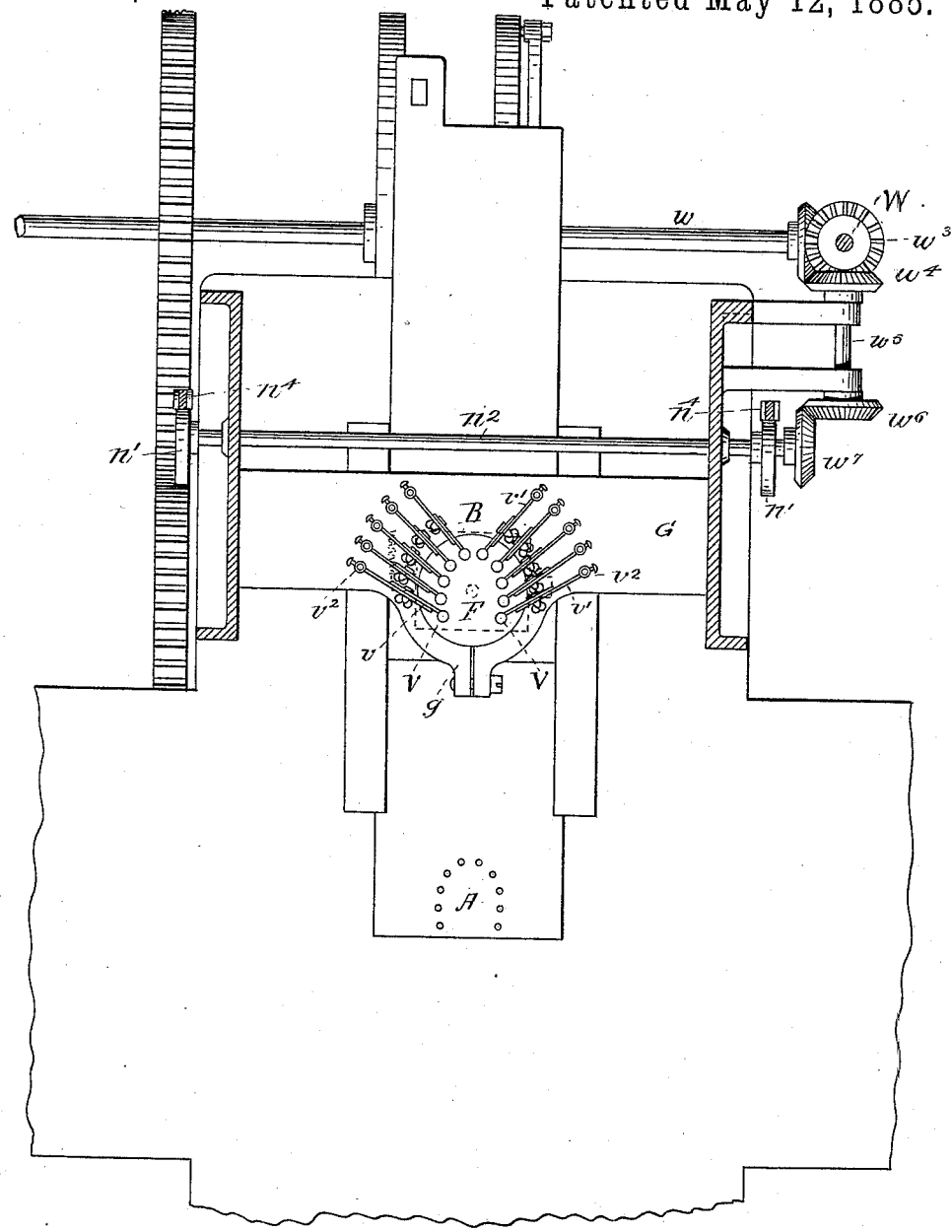

(No Model.)  5 Sheets—Sheet 4.
F. F. RAYMOND, 2d.
HEEL NAILING MACHINE.
No. 317,851. Patented May 12, 1885.
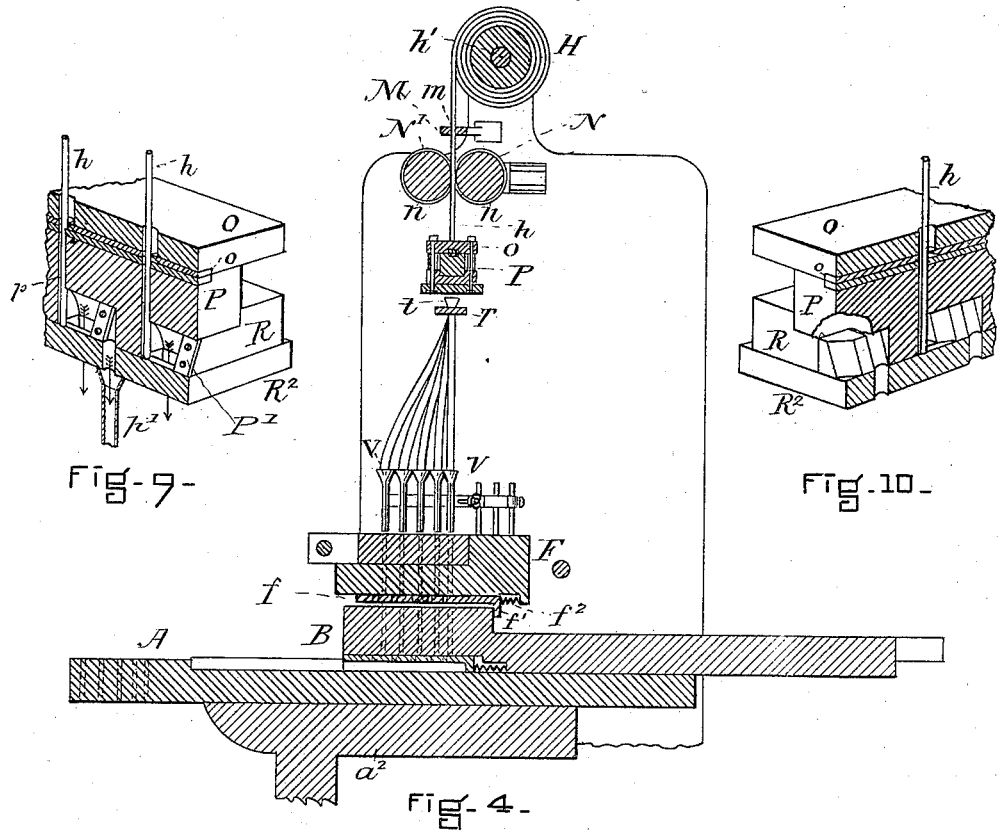
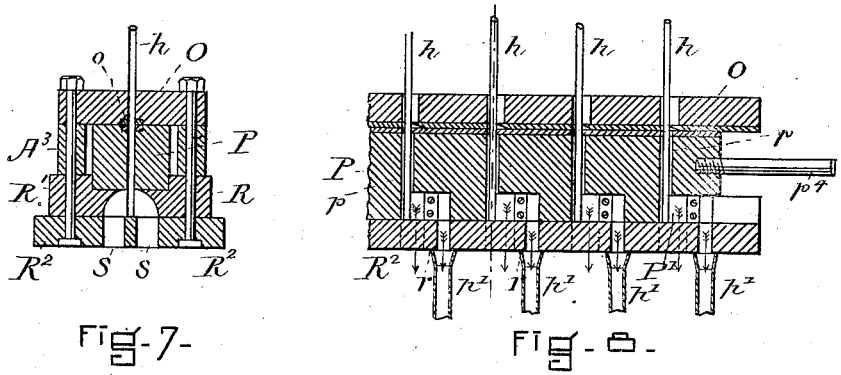
WITNESSES
Bowdoin S. Parker
Fred B. Dolan
INVENTOR
F. F. Raymond 2d (No Model.)
F. F. RAYMOND, 2d.
HEEL NAILING MACHINE.
No. 317,851. Patented May 12, 1885.
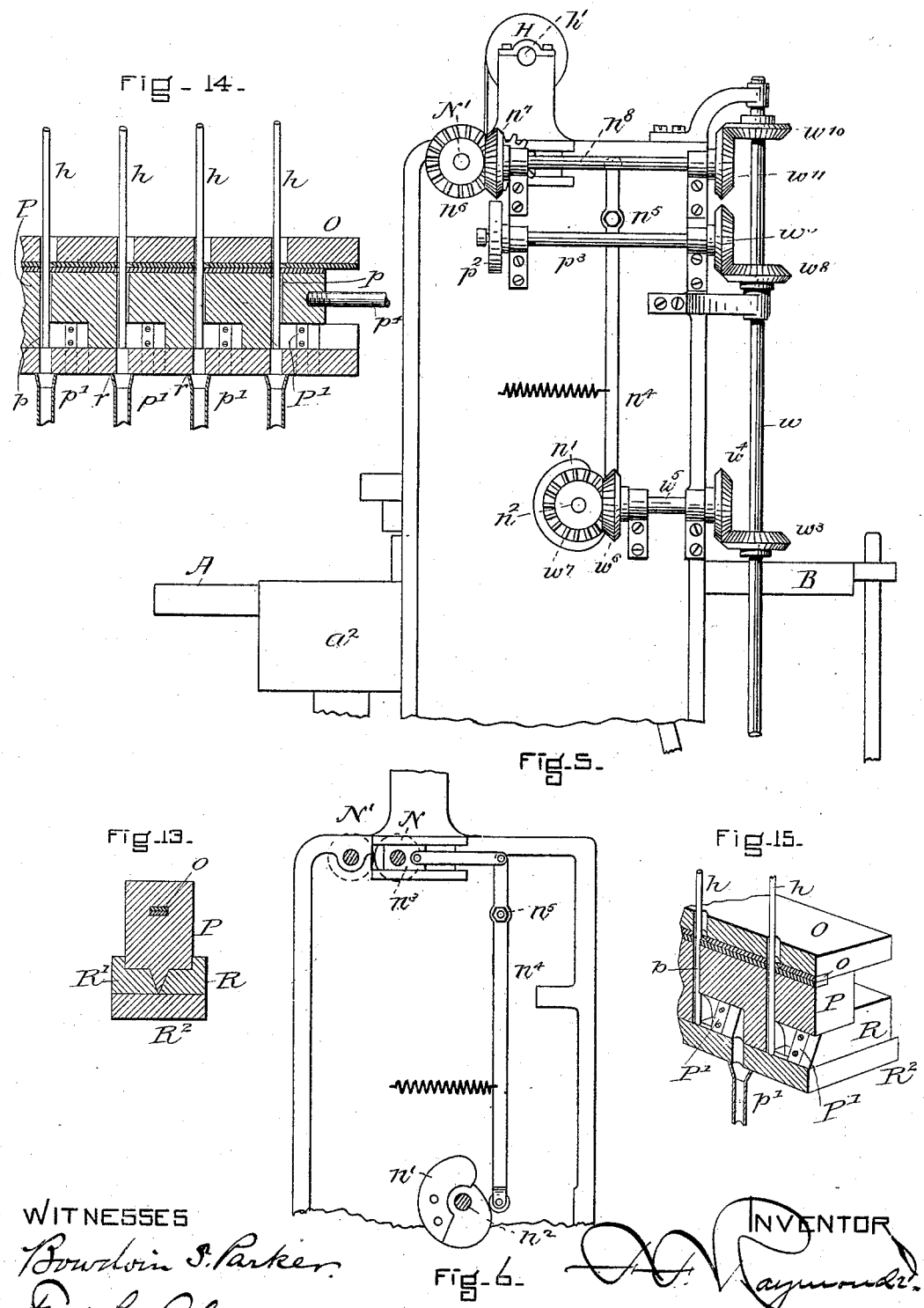

United States Patent Office.

FREEBORN F. RAYMOND, 2D, OF NEWTON, MASSACHUSETTS.

HEEL-NAILING MACHINE.

SPECIFICATION forming part of Letters Patent No. 317,851, dated May 12, 1885.

Application filed April 14, 1884. (No model.)

*To all whom it may concern:*

Be it known that I, F. F. RAYMOND, 2d, of Newton, in the county of Middlesex and State of Massachusetts, a citizen of the United States, have invented a new and useful Improvement in Heel-Nailing Machines, of which the following is a full, clear, and exact description, reference being had to the accompanying drawings, forming a part of this specification, in explaining its nature, in which—

Figure 1:
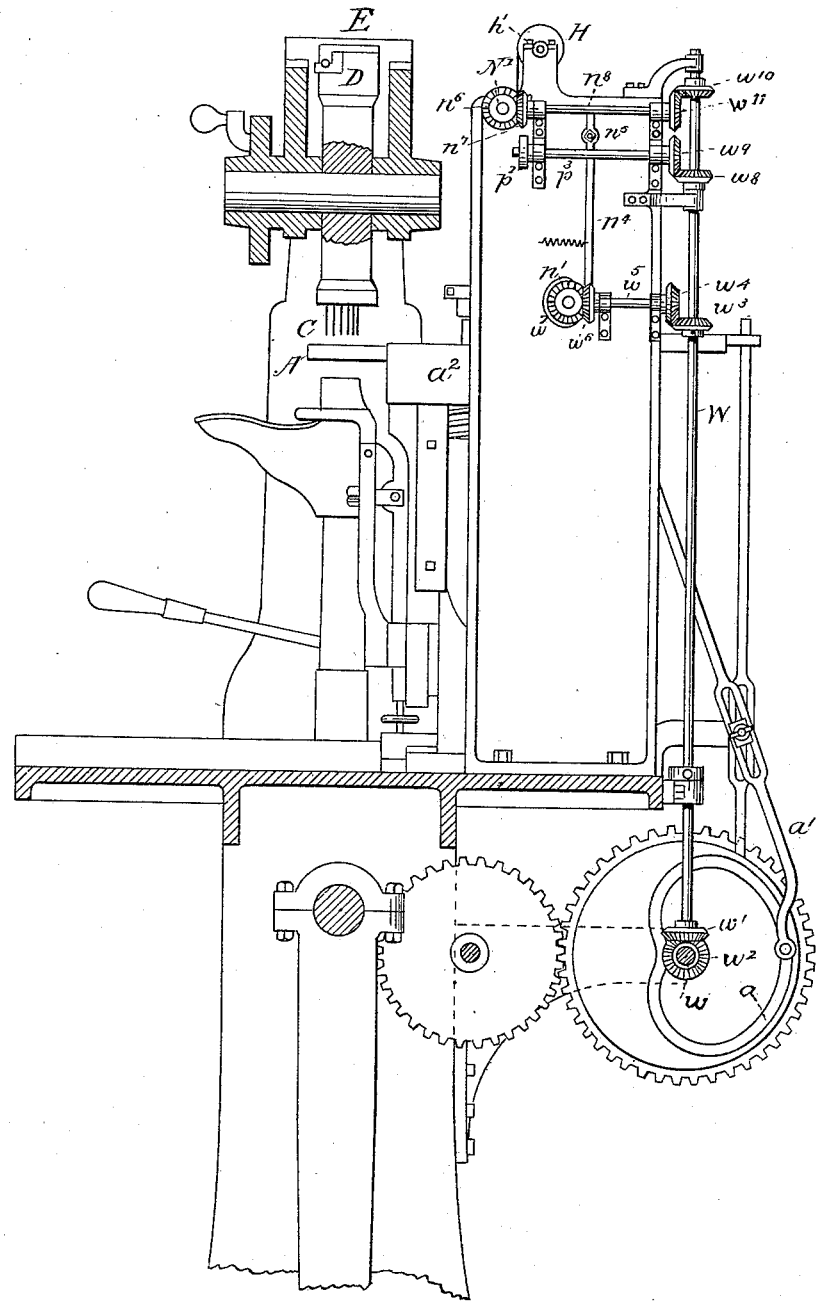
Figure 2:
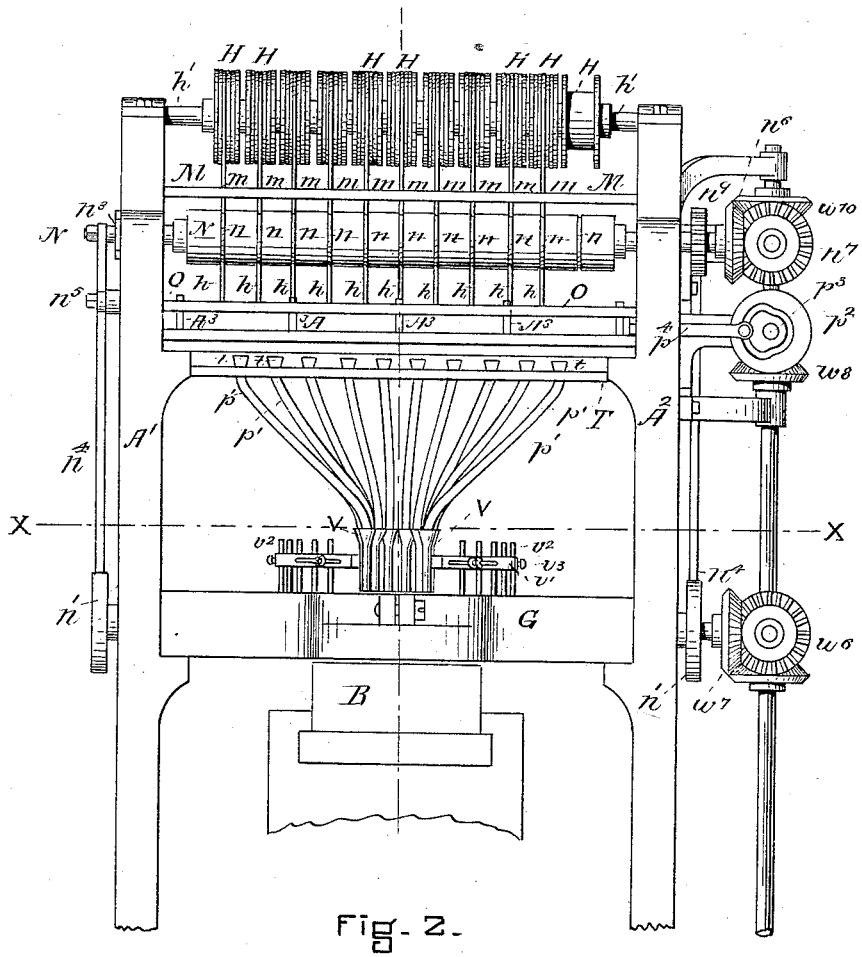
Figure 11:
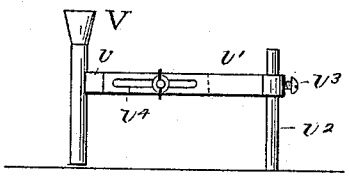
Figure 12:
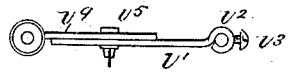

Figure 1 is a view part in section and part in side elevation of a heel-nailing machine having the features of my invention. Fig. 2 is a rear elevation, enlarged, of the machine, showing my improvement. Fig. 3 is a section and plan on and below the line $x\ x$ of Fig. 2. Fig. 4 is a view part in vertical central section and part in side elevation. Fig. 5 is a side elevation. Figs. 6, 7, 8, 9, 10, 11, 12, 13, 14, and 15 are detail views, hereinafter especially referred to.

The invention relates to devices for automatically feeding nails to a receiver of a heel-nailing machine or to the templet, and it comprises means for forming, separating, transferring, and driving the nails, compressing the heel-blank, and attaching the top-lift.

In the drawings, the nail-feeding and driving and heel-blank compressing mechanism is substantially like that shown in the Henderson and Raymond Patents No. 252,215, No. 259,687, and No. 290,109, and the operative parts of such portions of said inventions as are necessary to be referred to herein are the templet A, the nail-carrier or transferrer B, the gang of drivers C, the gang of awls, (not shown,) a top-lift spanker, D, and top-lift holder E.

When the top-lift holder and spanker are carried by the revolving head, it is desirable that the templet be automatically moved into and out of operative position, and this preferably is done by means of a cam, $a$, and lever $a'$, but it is not absolutely essential that the templet be moved out of position, because the top-lift holder and spanker can be moved into place under the templet and the templet then depressed with the top-lift holder or spanker, and mechanism for so operating this spanker and holder will form the subject-matter of a separate application. The templet and nail-carrier or transferrer are supported by a table, $a^2$, which has a vertical movement, preferably in opposition to a spring or weight upon its post. The nail carrier or transferrer is moved, preferably, automatically from a position under the nail holder or receiver F to a position over the templet. This nail holder or receiver is stationary and has a bottom plate, $f$, which is provided with holes corresponding to holes in the nail-receiver, and which closes or opens the holes therein, as it may be desirable to hold or release the nails in the receiver. The plate is moved to bring its holes in register with the holes in the nail holder and receiver upon the backward movement of the nail-transferrer, and is also closed upon the forward movement of the transferrer by means of projection $f'$ and spring $f^2$. Any other suitable equivalent means, however, for opening or closing this plate at the proper interval may be used. The receiver is supported in a table or block G, from which it is made removable in order that holders or receivers having any other desirable number of holes or any other arrangement thereof may be substituted. The receiver-blocks are made of the same size, so as to fit the same recess in the table, and they are held therein by means of the clamp $g$, or in any other desirable way. This nail-holder or receiver F is automatically supplied with nails at given intervals, and I have herein shown in addition to an automatic nail-distributer, an automatic nail-forming mechanism whereby I am enabled to form the nails from continuous wires fed automatically from suitable reels, and as I form a gang or group of nails at one operation it is desirable that there be as many wires as there are nails forming the gang or group, although, of course, this is not essential, as I shall hereinafter show.

In the drawings, $h$ represents the various wires, each one of which is drawn from a separate reel, H, mounted upon the rod $h'$. These reels, preferably, are free to revolve independently of each other upon the rod, and may be provided with any suitable clamping mechanism for holding them thereto with sufficient friction to provide such tension on the wire as may be desirable. From the reels the various wires pass through guide-holes $m$ in the guide-plate M, whereby they are separated and held apart, and from this plate they pass to the feeding mechanism, which in this case comprises the rolls N N', having grooves $n$ for each wire. These rolls may be continuous metal cylinders with the grooves formed therein, or may be made of separate disks each one of which has a groove, as may be desired. The feed-roll N' is positively revolved by means of mechanism hereinafter described, and is supported by stationary bearings. The other feed-roll, N, has a movement to and from the stationary feed-roll at stated intervals, and it is by this movement that I am enabled to control the length of the nail which is made. This I accomplish by moving the feed-roll N horizontally toward or from its accompanying feed-roll at given intervals which are determined by the cams $n'$ upon the shaft $n^2$. These cams are made in two parts and are movable in relation to each other and so shaped that their working-surface may be increased or decreased in length by moving the two parts toward or from each other, as the case may be, and they are secured to each other by means of pins or any other suitable locking device which shall permit them to be moved various predetermined distances apart. I do not, however, make any claim to the construction of these cams, but simply use them as a means of obtaining the movement of the feed-roll at proper intervals. I connect these cams with sliding boxes $n^3$, of the movable roll by means of levers $n^4$ pivoted at $n^5$. The roll N' is positively revolved by means of the bevel-gear $n^6$ $n^7$ and shaft $n^8$, and each of the rolls has a spur-gear, $n^9$, which mesh with each other, and the teeth of these gears may be so long that while the movable roll may be moved far enough from the other roll to prevent the feed of the wires it shall not be moved far enough to disengage its gear from the gear-wheel of the other roll, so that it shall always be revolved with the other roll. From the feeding device the wires are passed to the bed-plate O, which has holes corresponding in number and position to the grooves in the feed-rolls, so that a hole or feedway is arranged directly beneath each feed-groove. This bed is placed as near the feeding-rolls as necessary. Arranged immediately below this bed is the sliding block P, which also has holes or parts of the feedways $p$ for the reception of the various wires. These holes when the block is at rest register with the holes in the block O. The sliding block has a flat upper surface which fits closely the lower surface of the bed, and I provide the under surface of the bed and the upper surface of the sliding block with hardened steel cutters $o$. These steel cutters may be continuous throughout the length of the bed and sliding block, or may be made separate and set in a recess and fastened in place by a screw, and they form the means whereby the nails are severed from the wires. The sliding block is supported by the pointing cutter-bars R R', which are themselves supported by the cross-pieces $R^2$. The cutter-bars have a recess in their upper surface, in which the sliding block fits, and their lower opposing surfaces are inclined in relation to each other. Upon these inclines are fastened the pointing-cutters P', which are opposed to each other and form a V, and are held to the inclined surface of the support by a screw and steady-pin, or in any other desirable way, and I prefer to provide them with the solid metal end supports, as represented in Fig. 15. These supports are provided by forming shoulders upon the inclined sides of the blocks or bars R R', against which the back edge of the cutters rest. The front surface of these shoulders is parallel with that of the cutters, so that the V-shaped passage in which the end of each nail travels with this block P from the point where fed to the point where delivered is maintained unchanged. The sliding block P has a V-shaped extension, which fits the V-shaped recess between the blocks R R' of a width less than the width of the recess, and which acts to support the lower end of the wire blank while its sides are being sheared off by the cutters. These cutters are arranged out of line with the holes through the sliding block and bed, and in the operation of severing the nails and forming their points the block P is reciprocated, and this reciprocation not only severs the nails from the ends of the wires, but also brings the side surfaces of the lower ends of the wires in contact with the cutting-dies, the block moving the nails well past the dies, and bringing the holes therein in register with the distributing-passages $p'$, into which the nails drop, and the waste escapes through the holes or openings S, which extend downwardly from the cutting-edges of the dies through the cross-piece $R^2$. The block is then returned to its original position. The cross-pieces R R' $R^2$ and bed O are supported by the side frames A' $A^2$, and the bed and cross-pieces may be bolted together, in which case intermediate posts, $A^3$, should be inserted between the cross-bars R R' and the bed O in order to prevent the sliding block from being clamped between them. The sliding block P is reciprocated by means of the cam $p^2$ upon the shaft $p^3$ and the connecting-rod $p^4$.

The time of the machine, preferably, is this: The feed-rolls are operated to feed wires into the sliding block P, and the sliding block is then immediately reciprocated, cutting off the nails and pointing them and transferring them to a position from whence they drop through passages to the nail-receiver.

In lieu of the arrangement of passages or holes in the block $R^2$ through which the nails pass from the block P when the holes therein have been brought in line therewith, as above explained, the holes may be arranged as shown in Fig. 14—that is, in continuance of the holes in the block P when at rest—in which case the block P will be moved by its operating-cam to sever the nails from the wire and advance them past the pointing-cutters to form the points thereto, and will then be immediately returned with the nails to its normal position to deliver the nails through the said holes to the passages $p'$. The distributing passages or tubes connect the nail-forming devices with the receiver F, and I prefer to form them of some ductile metal or alloy, like pewter, so that their lower or delivery ends may be easily adjusted in substantially a horizontal plane. These tubes or passages have a somewhat flaring or open mouth, $t$, and they should be arranged immediately under the holes in the block $R^2$, so that spaces shall be left between them for the escape of the waste from the dies or cutters. They are supported at their upper ends by the block or plate T, and they open into the adjustable tunnels V, which are arranged immediately above the nail-receiver. These tunnels, preferably, are made of iron in tubular form, and are each supported upon the end of a horizontal arm, $v$. This horizontal arm is adjustable horizontally upon the arm $v'$, which is supported by a post, $v^2$, in such a manner that it may be swung radially and also moved vertically thereon, and it is fastened thereto by means of a thumb-screw, $v^3$, or in any other desirable way. The arm $v'$ has a slot, $v^4$, formed in it, through which a screw, $v^5$, attached to the other arm, $v$, passes, and by means of a thumb-screw the position of the tunnel in relation to the post may be varied. It will thus be seen that by this mechanism one set of tunnels and connecting-tubes may be used for all the receiver-blocks, as provision is made for the movement thereof in any direction—that is, they can be moved vertically or they can be moved horizontally into any position upon the receiver-block—so that if one receiver-block is taken out and another having a different arrangement of holes substituted, the tunnels can be easily adjusted to their new position; or, if a receiver having more holes is used, then other tunnels which have been temporarily withdrawn can easily be brought into the desired place. The holes in the receiver-block should be enlarged or flaring at their mouths, so as to render a nice adjustment of the tunnels unnecessary. It will be observed that by this arrangement of tubes and nail-guides I am enabled to gather nails from a nail-distributer distributing upon a straight line and deliver them upon a line of any reasonable curve. The shaft W, which operates the cams $n'$ $p^2$ and the feed-rolls, is connected with the shaft $w$ of the heel-nailing machine by means of the bevel-gears $w'$ $w^2$; but any other means for operating this portion of the mechanism may be employed. The shaft W drives the shaft $n^2$ by means of the bevel-gear $w^3$ $w^4$, shaft $w^5$, and bevel-gears $w^6$ $w^7$, and the shaft $p^3$ carrying the cam $p^2$ by means of the bevel-gear $w^8$ $w^9$, and the shaft $n^8$ by means of the bevel-gear $w^{10}$ $w^{11}$. It is obvious that I may use wire either round or square, or of any other shape, it being necessary only to make the shape of the various feed passages or holes to correspond. The grooves in the feed-rolls may have corrugations or may be roughened to corrugate or roughen the wire in its passage through them. The shape of the point which is given the nail of course depends entirely upon the shape and inclination of the cutters; but I prefer that the nail have a wide point or end formed by making a long bevel upon two sides of the nail, as such a nail will drive straight and clinch well. To vary the length of the nail it may be necessary to remove the sliding block P and substitute for it another, either of greater or lesser height according to the length of the nail, and in that event the position of the bed should be changed to correspond by removing the connecting-supports $A^3$ and substituting others of proper height. The wire-feeding cams of course will need to be adjusted to vary their throw when a change in the length of nail is desired. Less power will be needed for driving the sliding block if the holes in the bed and block are so placed that the action of cutting or severing of the nails shall not take place simultaneously, but rather successively or in successive groups. With pointed nails having two sides, substantially equally beveled, the use of awls for forming the holes in the heel except in heels of considerable thickness or hardness will not be necessary.

In the operation of this machine the work is placed in position, and if the templet is horizontally movable, it is moved into position over the heel. If awls are used, they are then driven, moving the templet down upon the work and locking it automatically thereon, so that the heel is held clamped upon the boot or shoe while the awls are withdrawn until the nails are driven. The nail-carrier then transfers the nails from the nail-holder to the templet and drops them into the templet, and the drivers are then reciprocated and the nails driven. The templet is then unlocked and the nail-carrier returned to a position to be loaded automatically from the receiver or holder, and the templet is either automatically withdrawn or not, according as may be desired. If withdrawn, and a top-lift is to be spanked on, then the spanker is reciprocated. If not withdrawn, the spanker-block is moved under the templet and another reciprocation of the machine is made, and the templet moved downwardly either by the nail-holder block or by another block which shall take its place, spanking the top-lift upon the heel. During these movements of the attaching portion of the device, the feed-rolls are operated to feed the wires, and the sliding block moved to sever the nails and form the points, and the formed nails distributed into the holes in the receiver.

Of course it is obvious that the nails can be severed from the wires and can be fed and driven without being pointed, if desired; or in lieu of forming the point by cutting the taper by means of cutters a sufficient point can be formed by compressing the end of the blank by means of dies, shaped substantially as shown in Fig. 9—that is, dies having a flaring mouth. In such case the dies would be supported as the pointing-cutters are supported, but instead of having a cutting-edge, would have a flaring or beveled edge, whereby the point of the nail would be gradually formed by the increasing compression as it is moved between them.

Having thus fully described my invention, I claim and desire to secure by Letters Patent of the United States—

1. The combination of the reciprocating gang or group of drivers, a templet and a nail receiver or holder, and a nail-carrier, substantially as described, for transferring a group of nails from the receiver or holder to a position to be driven by the drivers, all substantially as and for the purposes described.

2. In a heel-nailing machine, a nail receiver or holder and a nail-carrier, substantially as described, and adapted to be loaded with a gang or group of nails from the receiver or holder, and to transfer them to a position to be driven, and suitable driving mechanism, all substantially as and for the purposes set forth.

3. In a heel-nailing machine, the stationary nail holder or receiver having the sliding or movable perforated plate the holes of which are brought into and out of register with the holes of said receiver, in combination with a sliding nail-carrier, the templet, and the nail-driving devices, all substantially as and for the purposes described.

4. The combination of the nail receiver or holder F, the nail-carrier B, and means, substantially as specified, for automatically moving it from a position under the receiver or holder to a position over the templet, all substantially as and for the purposes described.

5. The combination of the nail holder or receiver with the adjustable nail guides or tunnels V, all substantially as and for the purposes described.

6. In a heel-nailing machine, the adjustable nail guides or tunnels V, all substantially as and for the purposes described.

7. In a heel-nailing machine, the combination of the nail-receiver F, the posts or supports $v^2$, the swinging adjustable arms $v\ v'$, and the tunnels or nail-guides V, all substantially as and for the purposes described.

8. In a heel-nailing machine, the combination of feeding devices adapted for simultaneously feeding a series of wires to the nail-severing devices, the nail-severing devices for cutting nails from said wires, and a series of conductors for conveying and guiding the nails from the severing devices to a heel-nail holder or receiver, and said nail holder or receiver, all substantially as and for the purposes described.

9. The combination, in a heel-nailing machine, of devices, substantially as specified, for severing a gang of nails from continuous wires, forming points thereon, and for conducting and guiding the formed nails from the severing devices to a heel-nail receiver or holder, and said heel-nail receiver or holder, all substantially as and for the purposes described.

10. The combination, in a heel-nailing machine, of a mechanism, substantially as specified, for feeding a number of wires simultaneously to a nail-severing mechanism, and means for simultaneously adjusting the extent of the feed, all substantially as and for the purposes described.

11. The combination of a series of reels for holding coils of wire, and feeding mechanism, substantially as specified, for simultaneously feeding a series of wires to severing devices for simultaneously or substantially simultaneously cutting nails from the ends of said wires, all substantially as and for the purposes described.

12. The combination of the reels H, the perforated plate M, and a multiple feeding device, substantially as specified, for simultaneously feeding a number of wires, all substantially as and for the purposes described.

13. The combination of the block P, having holes for receiving and holding the ends of a series of wires and the blanks cut therefrom, with a series of pointing-cutters, whereby upon the movement of the block past the cutters a series of nails are simultaneously or successively pointed, and the conductors, and heel-nail receiver or holder, all substantially as and for the purposes described.

14. The combination of the blank-holding block P and means for reciprocating the same, the cutters $v$, the nail-holding block having a downwardly-projecting V-shaped rib or extension, the conductors, and heel-nail receiver or holder, all substantially as and for the purposes described.

15. The combination of the block P, cam $p^2$, and connecting-bar $p^4$, the main shaft of the heel-nailing machine, and intermediate connecting mechanism, all substantially as and for the purposes described.

16. The combination of the feed-roll N' and means for revolving it, the movable feed-roll N, the cams $n'$, levers $n^4$, the main shaft of the heel-nailing machine, and intermediate connecting mechanism, all substantially as and for the purposes described.

17. The combination, in a heel-nailing machine, of devices for automatically feeding a series of nail-forming wires to nail severing and forming devices, said nail severing and forming devices, and a distributing device for receiving the nails from the severing mechanism and conducting and guiding them to a nail receiver or holder, said nail receiver or holder, a nail-carrier for transferring the nails from the receiver or holder to a position to be driven, and the nail-driving mechanism, all substantially as and for the purposes described.

18. In a heel-nailing machine, the combination of nail-feeding mechanism or devices adapted to feed nails automatically and to arrange them in a gang or group for simultaneous driving, substantially as specified, an automatic nail-carrier adapted to automatically receive said gang or group of nails and to automatically transfer them to a position to be driven, and nail-driving devices for simultaneously driving said nails, substantially as described.

F. F. RAYMOND, 2D.

Witnesses:
BOWDOIN S. PARKER,
FRED. B. DOLAN.